Nov. 21, 1939.　　　C. H. NORDELL　　　2,180,847

TESTING DEVICE

Filed Sept. 23, 1935　　　5 Sheets-Sheet 1

Inventor:
Carl H. Nordell
By Williams, Bradbury, McCaleb & Hinkle.
Attys.

Nov. 21, 1939. C. H. NORDELL 2,180,847
TESTING DEVICE
Filed Sept. 23, 1935   5 Sheets-Sheet 3

Inventor:
Carl H. Nordell
By Williams, Bradbury, McCaleb & Hinkle
Attys

Nov. 21, 1939. C. H. NORDELL 2,180,847
TESTING DEVICE
Filed Sept. 23, 1935   5 Sheets-Sheet 5

Inventor:
Carl H. Nordell
By
Williams, Bradbury, McCaleb & Hinkle
Attys.

Patented Nov. 21, 1939

2,180,847

UNITED STATES PATENT OFFICE 2,180,847

TESTING DEVICE

Carl H. Nordell, Chicago, Ill., assignor to Advance Engineering Company, Chicago, Ill., a corporation of Illinois Application September 23, 1935, Serial No. 41,750

11 Claims. (Cl. 23—253)

This invention relates to a testing device in which observation is made of the change of volume resulting from a reaction, which change may be either a contraction or an expansion, depending upon the reaction involved.

The present invention will be more particularly described in connection with a device for the testing of sewage and activated sludge used in the purification of said sewage. It will be understood, however, that the device can be employed for other purposes, for example, for measuring the rate of corrosion by determining the rate of contraction due to absorption of oxygen, or the rate of expansion due to the production of hydrogen. The nature of the reaction will, of course, depend upon the materials under treatment, as is well known to those skilled in the art.

In determining the rate of any reaction from the resulting change of volume of gases which may take part in the reaction or which may result from the reaction, certain definite precautions must be taken. Thus, a slight change of temperature will affect the volume of the liquid, gas and vessels, and intricate and difficult corrections are necessary for a correct determination.

One of the objects of the present invention is to provide a simple device whereby the correction is made automatically and the need of calculations is avoided.

Another source of inaccuracy is the occurrence of variable degrees of incomplete saturation of the liquid with the gases present above it. According to the present invention I provide an apparatus which comprises means for maintaining the liquid substantially saturated with the gases above it.

A further object of the invention is to provide a device comprising a reaction chamber, and power means, such as an electric motor, in which the heat of the motor is prevented from affecting the contents of the reaction chamber.

A further object of the invention is to provide a device of the character described, having a capillary tube containing a liquid piston, and provided with improved means for locating the piston at any desired position.

A further object of the invention is to provide an apparatus of the character described, comprising a reagent chamber through which the gases are caused to flow, said chamber being adapted to contain a reagent for absorbing gases which may cause erroneous observations, for example, sodium hydroxide for absorbing carbon dioxide in the case of sewage tests.

Other objects, advantages, and capabilities of the invention will appear from the following description of a preferred embodiment thereof, taken in conjunction with the accompanying drawings, in which.

Figure 1:
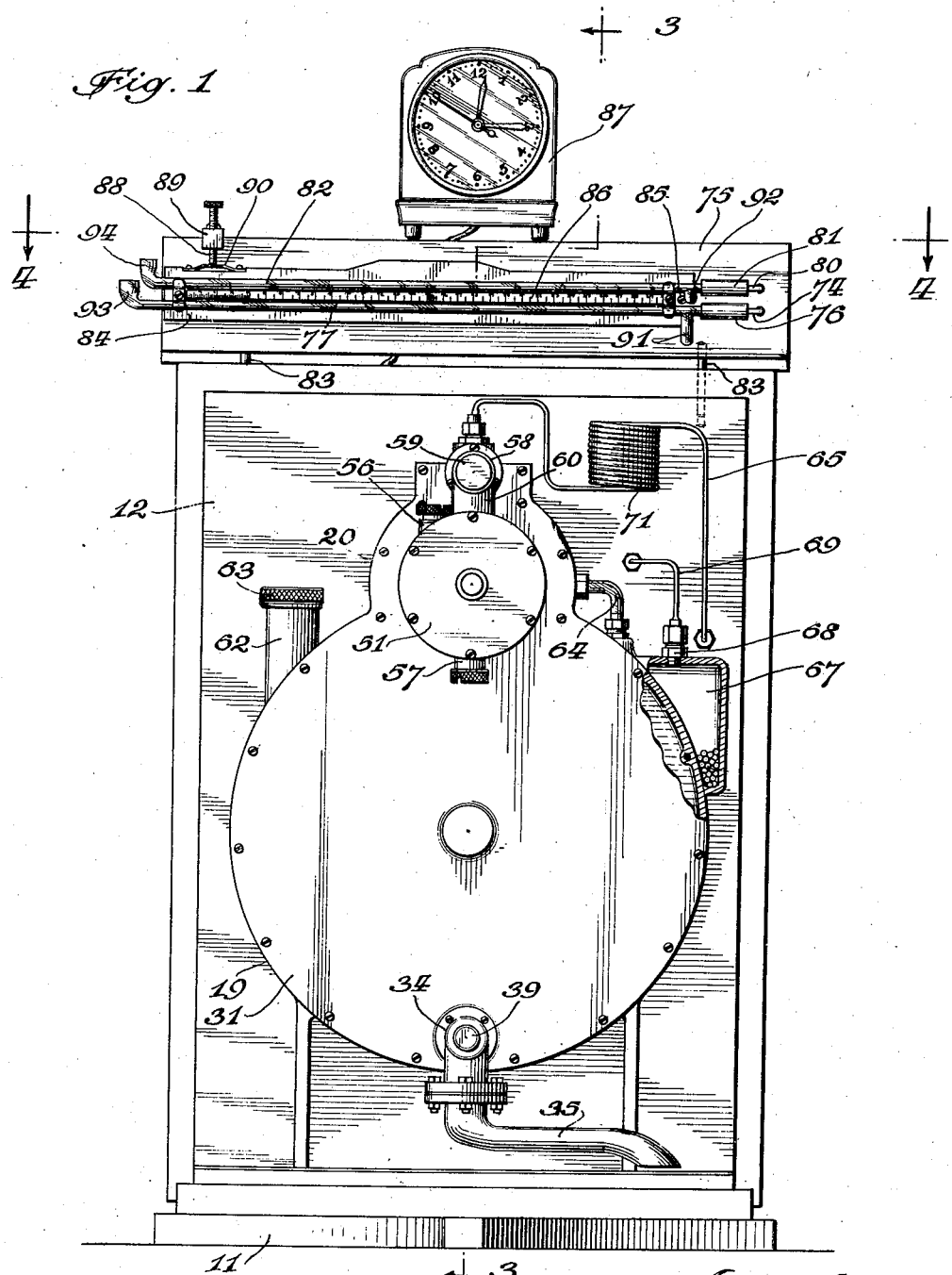
Figure 1 is a front elevation of a machine embodying my invention, the front cover being removed.
Figure 2:
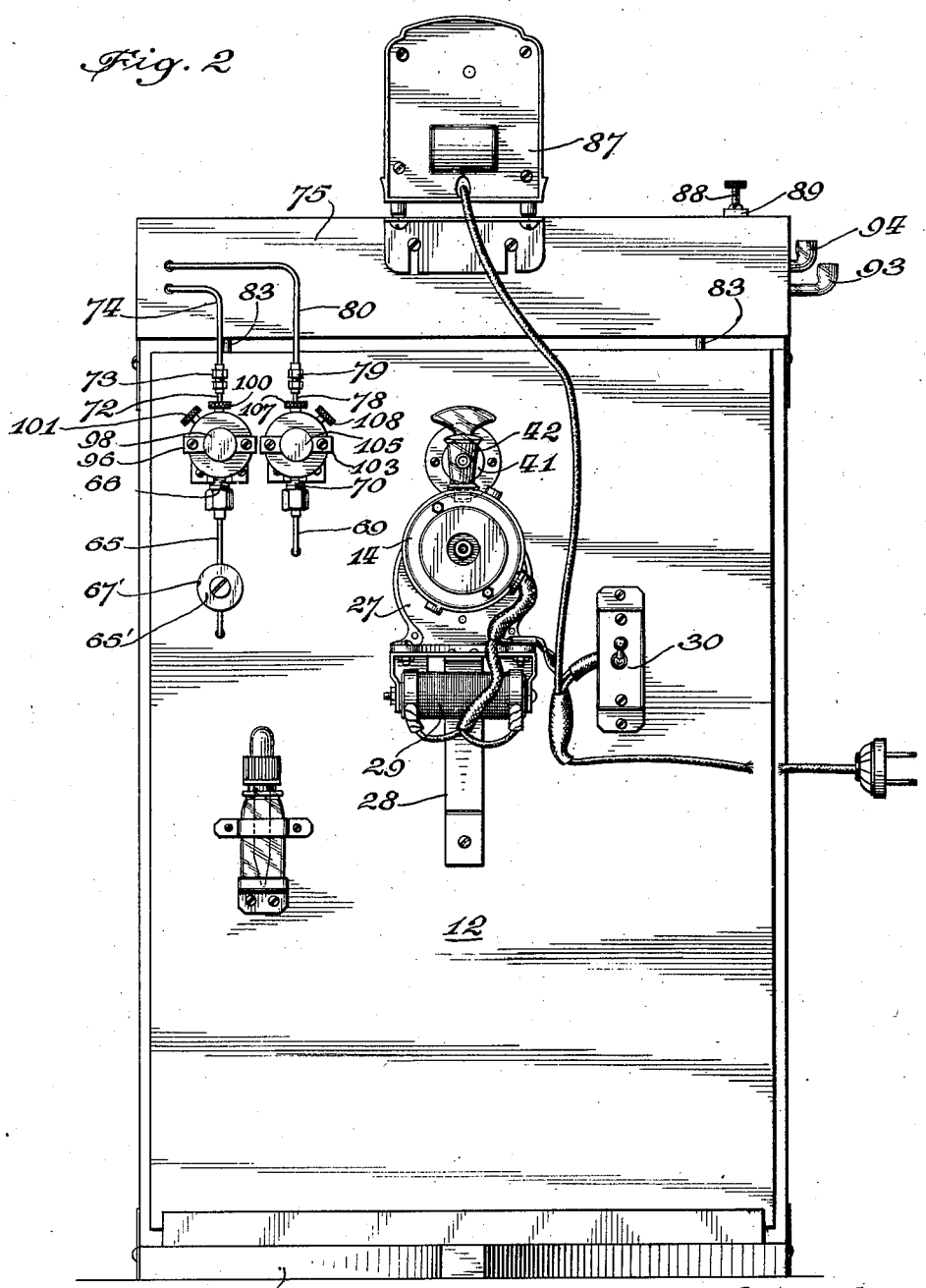
Fig. 2 is a rear elevation of the machine, the rear cover being removed.

Referring to the drawings, the machine comprises a base 11 upon which is mounted a vertical partition 12. The vertical partition 12 carries all the operating parts of the machine, the reaction chamber being mounted on one side and the electric motor 14 on the other side. The partition 12 comprises a layer 15 of insulating material so that the heat of the motor and changes of temperature on the outer side of this partition are prevented from exerting any material effect upon the contents of the reaction chamber 13 during operation. A front cover 16 is provided which can be applied during the operation of the machine for the purpose of preventing changes of temperature from materially affecting the contents of the reaction chamber.

This cover comprises a layer 17 of insulating material. The portion of the base 11 which underlies the cover 16 is also provided with a layer of insulating material designated by the reference numeral 18. It will be seen with reference to Fig. 3 that when the cover 16 is in place, the reaction chamber is completely enclosed within a chamber which is thoroughly insulated on all sides. Consequently, the change of temperature which occurs during any particular test, is relatively small. As will hereinafter appear, the apparatus is provided with means whereby any change of temperature which does occur is automatically taken care of by the apparatus so that a direct reading can be made without any correction for variation of temperature.

Figure 6:
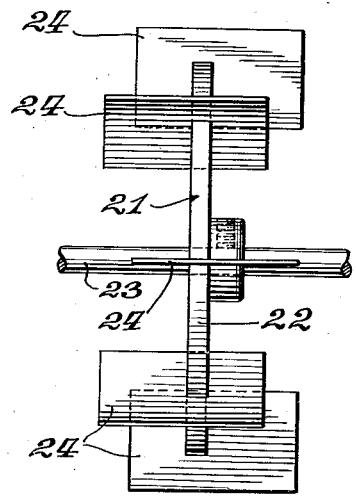
Fig. 6 is a front elevation thereof.
Figure 7:
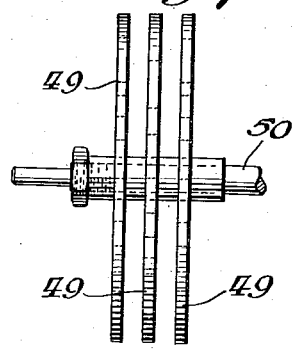
Fig. 7 is a front elevation of the reagent disks.
Figure 8:
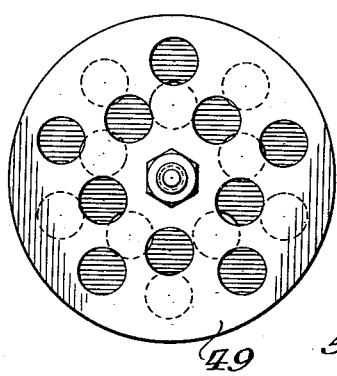
Fig. 8 is a side view of these disks.

The reaction chamber comprises a relatively large lower chamber 19 of generally cylindrical form. At its upper end the liquid chamber 19 communicates with a smaller chamber 20, also of substantially cylindrical form. The upper chamber 20, which is normally filled with gas, contains a paddle or stirring element 21 which projects somewhat into the chamber 19 so as to agitate the liquids contained therein. The paddle or stirring element 21 comprises a disk 22 which is mounted on a shaft 23. The disk 22 carries paddle plates 24 which are located in radial planes and which are preferably offset alternately in the manner shown in Fig. 6.

The shaft 23 passes through a stuffing box 24' on the rear face of the chamber 20. Its rear end, which is located to the rear of the partition 12, is connected by a coupling 25 to the output shaft 26 of a gear reduction 27. The gear reduction 27 is driven by the motor 14 and both the motor and gear reduction are carried by a bracket 28 mounted on the rear face of the partition 12. Any suitable type of motor may be employed. I have illustrated a standard universal motor associated with a conventional resistor 29. The motor may be turned on and off by means of a switch 30. This switch is located on the rear side of the partition 12 so that it may be turned on and off while the front cover 16 is located in operating position in front of said partition.

The reaction chamber, which includes the chambers 19 and 20, may preferably be in the form of a relatively shallow dish located edge upwards. The top or front of this dish is closed by a cover 31 which conforms to the configuration of the chambers 19 and 20. A suitable gasket 32 is provided in order to make the chamber leak-proof. Near its lower edge the cover 31 is provided with an opening 33 which communicates with an outlet fitting 34 mounted on the cover 31. Upon the outlet fitting 34 is mounted a swinging draw-off arm 35 which may be swung outwardly beyond the base 11 when it is desired to empty the reaction chamber.

The fitting 34 is provided with an internal collar 36 in alignment with the opening 33. This collar is adapted to receive a stopper 37 so as to maintain the liquid within the reaction chamber. The stopper 37 is mounted on a rod 38 which extends through the fitting 34 and has mounted on its outer end a button 39. It will readily be understood, with reference to Fig. 3, that when this button 39 is pulled outwardly the stopper 37 is moved out of its position within the collar 36 and the liquid within the chamber 19 is free to flow downwardly through the fitting 34 and arm 35. When the test is being made, the arm 35 is moved inwardly to permit the cover 16 to be placed in operating position.

The rear wall of the reaction chamber is provided near its upper end with a nipple 40 which projects rearwardly through an opening in the partition 12. The nipple 40 is closed by a perforated stopper 41, preferably of rubber, carrying a valve 42. It will readily be understood that by merely rotating the valve 42, the chamber 20 may be put into or out of communication with the atmosphere.

The front wall is provided with an opening 43 adjacent its upper end and with an opening 44 in alignment with the shaft 23. A reagent chamber 45 is mounted on the front plate 31 with integral conduits 46 and 47 communicating with the openings 43 and 44 respectively. The usual gaskets are provided around these openings to maintain communicating chambers in air-tight condition. The conduit 47 communicates with the center of the reagent chamber 45. This reagent chamber normally contains perforated reagent disks 49 which are mounted on a shaft 50, the perforations being preferably relatively offset to cause the gases flowing through them to change directions frequently and impinge against the disks which are wet with reagent.

Figure 9:
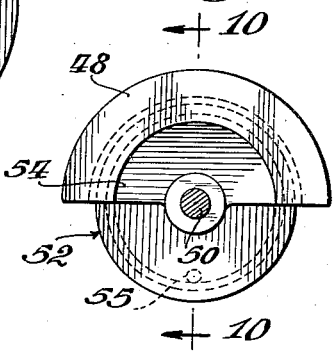
Fig. 9 is an end view of the separating means between the reagent chamber and the gas chamber.
Figure 10:
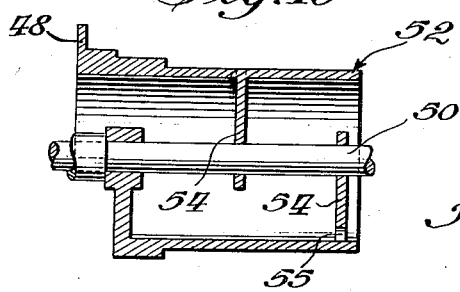
Fig. 10 is a sectional detail view on the line 10—10 of Fig. 9.

The shaft 50 has an outer bearing in the cover 51 of the reagent chamber. Its other end extends through openings in the walls of the separating member 52, which is shown in detail in Figs. 9 and 10. At its innermost end the shaft 50 is connected to the shaft 23 by means of a coupling 53 so that the two shafts rotate together. The separating means 52, which is located in the conduit 47 with a pressed fit, prevents the paddle wheel 21 from splashing an excessive amount of fluid through the conduit 47 into the reagent chamber 48. The separating means may consist essentially of a tubular portion which has a tight fit in the opening 47. It is provided with spaced parallel baffles 54 which extend upwardly and downwardly alternately for somewhat more than half the cross-sectional area of the tubular portion. These walls are provided with openings through which the shaft 50 passes, as best seen in Fig. 10. The baffle 54 which is nearest the reaction chamber is provided with a perforation 55 so that any liquid which splashes from the reaction chamber into passage 52 may drain into the reaction chamber. One end of the separating means 52 projects into the reagent chamber and is provided with a drip ridge 48 which returns any drops of reagent into the reagent chamber.

Figure 3:
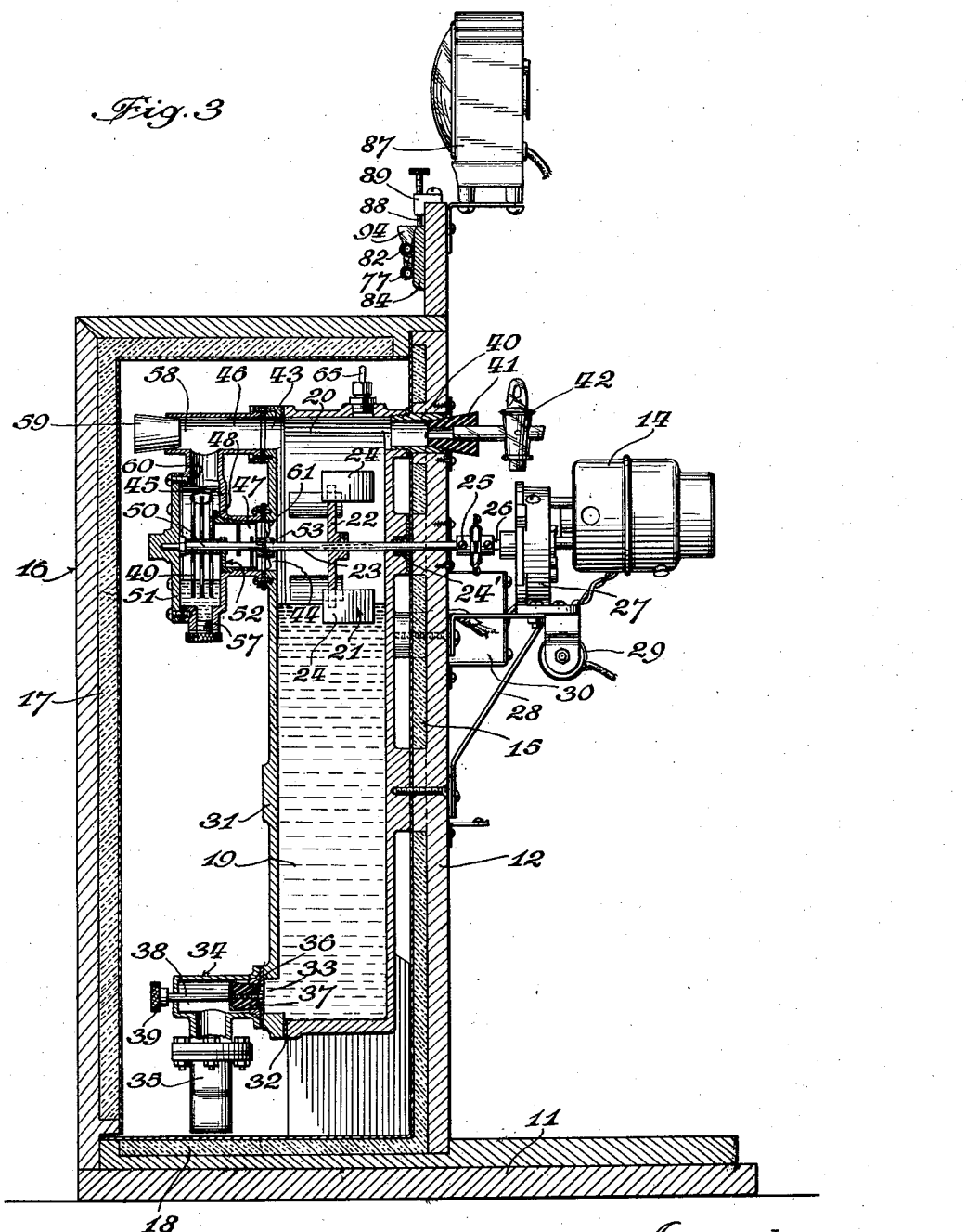
Fig. 3 is a sectional elevation, taken on the line 3—3 of Fig. 1.
Figure 4:
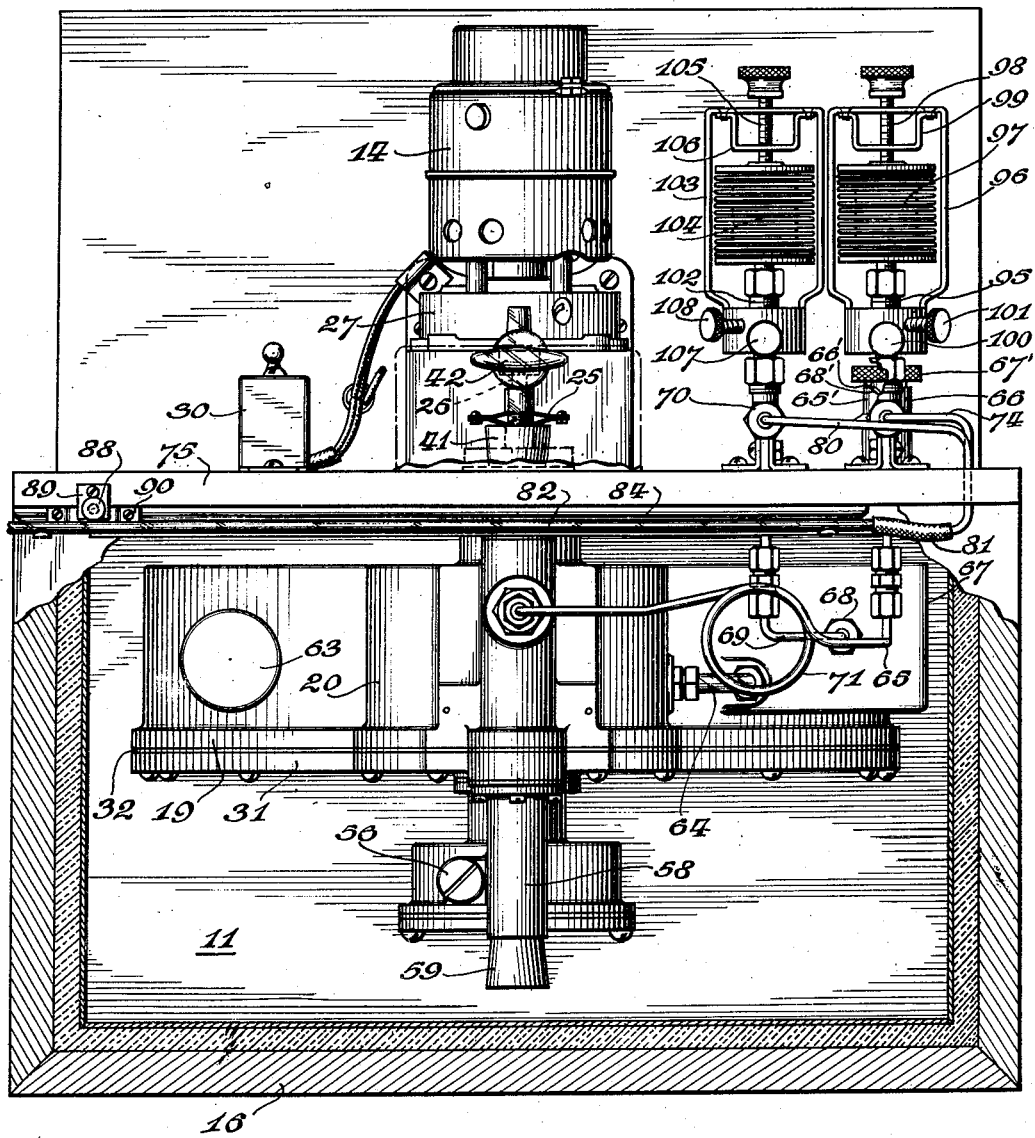
Fig. 4 is a sectional plan, taken on the line 4—4 of Fig. 1, the front cover being in operating position.
Figure 5:
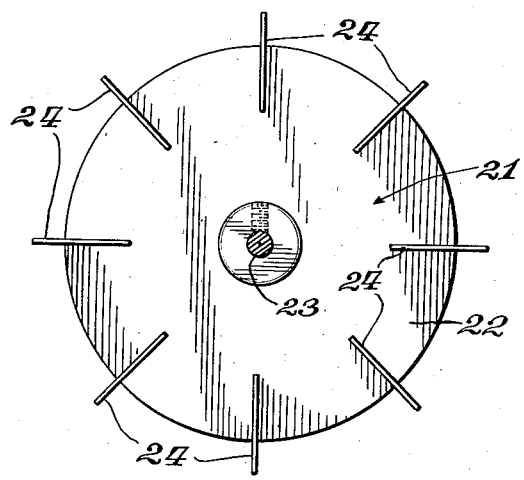
Fig. 5 is a side elevation of a paddle wheel which agitates the liquid in the machine.

The reagent chamber 45 is provided with an inlet 56 for the introduction of reagent and an outlet 57 whereby the reagent may be drained. The inlet 56 and outlet 57 are both provided with stoppers which are tightly closed during operation of the machine. The conduit 46 is continued forwardly, as best shown in Fig. 3, to provide an air inlet 58 which may be closed by a stopper 59. The air inlet 58 and the conduit 46 communicate with the reagent chamber 45 through the conduit 60.

With reference to Fig. 3, it will be understood that the centrifugal action caused by the rotation of the paddle wheel 21 will cause air to circulate from the chamber 20 through the conduit 46, reagent chamber 45, and conduit 47. If desired, this circulation of air may be accentuated by propeller vanes 61 mounted in any suitable manner on the shaft 50 or 23. In the present instance I have illustrated these propeller vanes as being mounted upon the coupling 53.

The chamber 19 is provided with a filler spout 62 normally closed by a stopper 63. A water level glass 64 communicates with the chamber 19 and the chamber 20 and serves to indicate whether or not this chamber contains the proper amount of liquid. A small metal tube 65 communicates with the upper end of the chamber 20 and extends through the partition 12 to the lower end of a tee 66 carried on the rear side of the partition 12. In the line on the rear side of the partition 12, a snap valve 65' is provided in the tube 65. This valve is normally biased towards the closed position, but it can be held in open position by the engagement of projections 66' with the end of the valve housing. A slight turn of the knurled head 67' causes the projections 66' to drop into notches 68' and close the valve. When the valve is thus closed, communication is instantly shut off between the reaction chamber and the tube 77.

An enclosed temperature well 67 is formed upon the exterior of the chamber 19, being preferably cast integral with this chamber. The chamber 67 is provided with an opening normally closed by a fitting 68, through which fitting a small metal tube 69 makes communication with the temperature well 67. The tube 69 extends through the partition 12 and is connected to the lower end of a tee 70, also mounted on the rear face of the wall 12. It may here be noted that the tube 65 is of considerable length to provide a damping effect for a purpose which will be more readily understood in view of later discussion. This considerable length may be suitably provided by forming part of the tube 65 into a coil 71, as best seen in Fig. 1. The upper end of the tee 66 is connected to a tube 72. The tube 72 is connected by a coupling 73 to a metal tube 74. The tube 74 extends through an opening in an instrument panel 75 and is connected by a piece of rubber tubing 76 to a glass capillary tube 77. The upper end of the tee 70 is connected to a metal tube 78 which is connected by a coupling 79 to a metal tube 80. The metal tube 80 also extends through the instrument panel 75 and it is connected by means of a rubber tube 81 with a glass capillary tube 82.

The instrument panel 75 is removably mounted on the upper end of the partition 12, for example by means of dowel pins 83. When the instrument panel is placed in position, the pipe 72 is coupled with the pipe 74 and the pipe 78 is coupled with the pipe 80 by means of the couplings 73 and 79 respectively.

The capillary glass tubes 77 and 82 are located in parallel relation and are mounted on a strip 84 which is pivotally mounted by means of a screw 85 upon the instrument panel 75. Between the tubes 77 and 82 is located a scale 86, suitably marked so that readings may be taken. On the upper edge of the instrument panel 75 may be mounted a clock 87. The free end of the strip 84, that is, the end remote from the pivot 85, is supported by a screw 88. This screw is threaded in the block 89 carried by the panel 75, its lower end being rotatably connected to a stirrup 90 which is secured to the strip 84. It will be understood that the strip 84 may readily be leveled by suitable manipulation of the screw 88 so that the tubes 77 and 82 may be adjusted to exact horizontal position.

Near the rubber tubes 76 and 81, the tubes 77 and 82 are provided with depending wells 91 and 92 respectively. Consequently, if the pistons of liquid, hereinafter to be more fully described, are drawn inwardly excessively the liquid will drop into these wells and will not pass into the tubes 74 and 80. The free ends of the tubes 77 and 82 project beyond the end of the strip 84 and are turned upwardly, as shown in Fig. 1. These upturned ends are enlarged to provide small cups 93 and 94 for the reception of liquid to form the pistons referred to.

The horizontal or middle leg of the tee 66 carries a nipple 95 upon which is mounted a substantially rectangular frame 96. The nipple 95 communicates with one end of a metal bellows 97 which is carried by the nipple. A screw 98, which is threaded in the frame 96 and in a member 99 carried thereby, abuts against the free end of the bellows 97. A valve 100 closes communication between the tee 66 and the bellows 97. A valve 101 establishes free communication from the bellows 97 to the outer atmosphere.

The middle or horizontal leg of the tee 70 is connected to a nipple 102 upon which is carried a frame 103. The rearmost end of the nipple 102 is connected to a metal bellows 104. A screw 105, threadedly mounted on the frame 103 and in a member 106 carried thereby, bears against the rear or free end of the bellows 104. A valve 107 is adapted to close and open communication between the tee 70 and the bellows 104. The valve 108 is adapted to put the interior of the bellows 104 into communication with the atmosphere.

The apparatus will now be described in connection with its principal purpose, that is, the determination of the rate of oxidation in sewage or, rather, a mixture of sewage and activated sludge.

A piston of liquid is placed in each of the tubes 77 and 82, the piston being introduced by the cups 93 and 94. When this is done, the valves 65', 42, 107 and 108 are open. Four or five drops of colored fluid, such as kerosene, are sufficient for the production of fluid pistons. The pistons should be run backward and forward in the tubes 77 and 82 in order to wet the surface thereof. The strip 84 should be leveled by means of the screw 88 until the fluid does not gravitate in one direction or the other in either of the tubes.

Preparatory to a determination, the pistons are set at a definite division of the scale. This is effected by closing the valve 65', closing the valve 101, opening the valve 100, and opening or closing the bellows 97 by means of the screw 98 to bring the fluid piston into desired position. When that is done the valve 100 is closed. The fluid piston in the temperature tube 82 is then adjusted to the same division by opening the valve 107, closing the valve 108 and actuating the screw 105 to move the piston to the desired position. These adjustments are made immediately before the actual test is made. A standard quantity of mixed liquid, consisting of sewage and activated sludge, is introduced into the chamber 19; the exact quantity being shown by the level glass 64. The motor 14 is started, the stopper 59 is removed, and the valve 42 is opened. A suitable amount of 10% sodium hydroxide solution is introduced into the reagent chamber 48. The fluid pistons are adjusted to position as described above. The plug 59 is put in position, the valve 65' is opened, and the valve 42 is closed. The time at which the valve 42 is closed is carefully noted and the motor is allowed to run for a certain period of time, which gives a substantial movement of the fluid piston in the tube 77. The normal course is to operate for a predetermined time, that is, for an exact number of minutes at the end of which time the valve 65' is snapped closed. Readings may now be made at leisure and the amount of oxygen absorbed corresponds to the length of the tube 77 through which the liquid piston has been displaced. If any change of temperature has occurred, the piston in the tube 82 will have made a corresponding movement and the corrected volume corresponds to the difference between the two readings of the tubes 77 and 82.

To attain the above results and to deduce from them the rate of oxygen utilization of the mixed liquid, the instrument must be calibrated. Using the same volume of liquid in each test, the air capacity of the apparatus is constant. To arrange for the temperature correction it is necessary that the thermometer constituted by the thermometer well 67, the tube 69, the tube 80 and the tube 82 must respond to changes in temperature to exactly the same extent as the system including the reaction chamber 13 and the tube 77. That is, if a certain change of temperature moves the liquid piston in the tube 77 one centimeter, then the same change should move the liquid piston in the tube 82 one centimeter. I prefer to make the thermometer well 67 somewhat larger than is necessary for this purpose. In calibration I merely reduce the volume of the well 67 by adding an appropriate number of shot to bring response of the thermometer system into unison with that of the absorption system. The effect of temperature increase in the absorption system comprises several factors. In the first place, absorption chamber 13 expands. The liquid, which may be regarded as water, in the chamber 19 expands to a greater extent and the air or gases above the liquid expand to a still greater extent. In addition, a certain small amount of gases, such as oxygen and nitrogen, come out of solution in the liquid with a rise in temperature and effect a correspondingly small increase in volume of the gas above the liquid.

Carbondioxide may be regarded as constant, because it is being absorbed continuously by the reagent in the reagent chamber 48. Using a constant quantity of liquid, the volume of the gas space left is known and from these two volumes can be deduced the effective expansion of the system for each degree of change of temperature. Knowledge of the cross-section of the tube 77 enables me to say that for each degree of change of temperature there is a movement of the fluid piston of so many scale divisions. Theoretically, the correction should be made in the thermometer system for the expansion of the thermometer well. Since this well is made of the same material as the reaction chamber, a fair approximation to accuracy can be obtained by disregarding the influence of the expansion of the metal in both the thermometer system and the absorption system. Knowing the cross-section of the tube 82 and the desired displacement of the fluid piston for each degree of temperature, I can very readily adjust the volume of the well 67 by adding shot thereto, as explained above, in order to obtain exact correspondence for temperature change in both tubes.

In practice I have found that this automatic correction for temperature change is very important and very useful. A change of one degree centigrade may mean as much as 20 divisions displacement of the fluid piston. While I prefer to avoid changes of temperature during an actual reading, it is very desirable to have an automatic correction in the form of the thermometer system including the well 67 and the tube 82.

Slight barometric changes during each period of absorption determination are substantially compensated by the same apparatus used for automatic temperature compensation.

In practice I have found that the duration of test varies within wide limits. In some cases where rapid oxidation is occurring, the test has to be terminated at the end of half a minute. In other cases the test may run as long as 15 or 30 minutes.

The cross-sectional area of the tube 77 being known, the displacement occurring within a definite time being also known, I am able to determine the rate of oxygen utilization by the sample contained in the chamber 19. The volume of this sample being known, I can very readily determine the rate of oxygen utilization in parts by weight per million parts of liquid per hour. For convenience I designate this rate of oxygen utilization as the Nordell Number for that particular liquid at the time the test was made.

It will be understood that when the machine is used for other purposes, for example determining the rate of corrosion as evidenced by the rate of oxidation on the one hand, and the production of hydrogen on the other hand, the modus operandi will be substantially similar to that described above. It should be borne in mind, however, with particular reference to the initial setting of the piston in the tube 77, that where a gas such as hydrogen is produced the result will be expansion of volume rather than contraction, and the liquid piston should be placed in the tube 77 accordingly. It will be understood that in tests such as corrosion, particular liquids may have to be employed and the apparatus should be made of a metal which will resist these liquids. For the purposes of sewage tests, I prefer to make the apparatus of Monel metal or other suitable resistant metals. For some tests no reagent would be necessary or useful in the reagent chamber.

Although the invention has been disclosed in connection with the specific details of a preferred embodiment thereof, it must be understood that such details are not intended to be limitative of the invention except in so far as set forth in the accompanying claims.

Having thus described my invention, what I claim as new and desire to secure by Letters Patent of the United States is:

1. A testing device comprising a closed chamber, a mechanical agitator in the upper part of the chamber adapted to intermix liquid and gas therein, power means exterior to said chamber for actuating said agitator, said chamber being provided with an enlarged opening for the introduction of liquid into the chamber, a closure for said opening, a straight, relatively long and substantially uniform capillary tube communicating with the upper end of said chamber and with the atmosphere, and a liquid piston wholly within the capillary tube for indicating slight volume changes within the chamber.

2. A testing device comprising a closed chamber having an opening for the introduction of liquid into the chamber, a closure for said opening, a mechanical agitator in the upper part of the chamber adapted to intermix liquid and gas therein, a substantially horizontal uniform capillary tube communicating with the upper end of said chamber and with the atmosphere, a liquid piston wholly within said tube indicating slight volume changes within the chamber, and a thermometer having a bulb portion adjacent said chamber and subject to the temperature thereof and a stem portion for indicating temperature change, said chamber occupied by liquid to a standard extent and said thermometer being graduated so that the same change of temperature will displace the liquid piston and the thermometer medium the same distance.

3. A testing device comprising a closed chamber having an opening for the introduction of liquid into the chamber, a closure for the opening, a substantially uniform capillary tube communicating with said chamber, a liquid piston wholly within the capillary tube for indicating changes of volume in the chamber, a gas thermometer bulb adjacent said chamber and subject to the temperature thereof, a capillary tube connected thereto, a liquid piston wholly within the capillary tube for indicating changes of volume in the thermometer bulb, said tubes being arranged in parallel spaced relation and said thermometer being calibrated so that its piston and the piston associated with the reaction chamber move equally in response to change of temperature.

4. A testing device comprising a closed chamber having an opening for the introduction of liquid into the chamber, a closure for said opening, a substantially horizontal capillary tube communicating with said chamber, a liquid piston in said capillary tube for indicating changes of volume in said chamber, a gas thermometer bulb adjacent said chamber and subject to the temperature thereof, a capillary tube connected thereto, a liquid piston in last said capillary tube for indicating changes of volume in the thermometer bulb, said tubes being arranged in parallel spaced relation and said thermometer being calibrated so that its piston responds equally to that of the reaction chamber, to change of temperature, means for adjusting said pistons in the tubes to bring them to desired relative position, and a scale adjacent said tubes whereby changes of volume due to reaction automatically corrected for temperature change may be read directly.

5. A testing device comprising a closed chamber having an opening for the introduction of liquid into the chamber, a closure for said opening, a straight, uniform capillary tube communicating with said chamber and with the atmosphere, a short liquid piston wholly within the capillary tube, a gas thermometer comprising a bulb adjacent said chamber and subject to the temperature thereof, a capillary tube adjacent the first said capillary tube communicating with the thermometer bulb and with the atmosphere, a short liquid piston wholly within last said capillary tube, valves controlling communication between said tubes and the chamber and bulb respectively, and means associated with said chamber and said bulb for moving said pistons independently of each other.

6. A testing device comprising a closed chamber having an opening for the introduction of liquid into the chamber, a closure for said opening, a substantially horizontal capillary tube communicating with said chamber, a liquid piston within said tube, a gas thermometer comprising a bulb adjacent said chamber and subject to the temperature thereof, a capillary tube adjacent said capillary tube and communicating with said bulb, a liquid piston within last said tube, said tubes being arranged in adjacent parallel relation, a scale adjacent said tubes, a bellows connected to each of said tubes, and valves for closing communication between said bellows and tubes.

7. A testing device comprising a closed chamber having an opening for the introduction of liquid into the chamber, a closure for said opening, a capillary tube communicating with said chamber, a short liquid piston wholly within the capillary tube, a gas thermometer comprising a bulb adjacent said chamber and subject to the temperature thereof, a capillary tube communicating with said bulb and located adjacent the first said capillary tube, a short liquid piston wholly within last said capillary tube, said tubes being arranged in parallel relation, a scale adjacent said tubes, a bellows connected to each of said tubes, valves for closing communication between said bellows and tubes, and a valve between said chamber and the associated bellows and tube.

8. A testing device comprising a closed reaction chamber having an opening for the introduction of liquid into the chamber, a closure for said opening, a thermometer well subject to the temperature of said chamber, a pair of substantially horizontal uniform capillary tubes, resilient conduit means connecting said tubes to said chamber and said well respectively, said tubes being open at their opposite ends to the atmosphere, a liquid piston within each capillary tube, a member carrying said tubes in substantially parallel relation, and means for adjusting said member relative to the chamber to level the tubes.

9. A testing device comprising a closed reaction chamber having an opening for the introduction of liquid into the chamber, a closure for said opening, a thermometer well subject to the temperature of said chamber, a pair of substantially horizontal capillary tubes connected to said chamber and said well respectively, a liquid piston in each tube, a member carrying said tubes, means for adjusting said member relative to the chamber to level the tubes, said well being calibrated so that displacement of the associated pistons due to temperature change of the chamber and well is the same, and a scale adjacent said tubes for indicating change of volume in the reaction chamber due to causes other than temperature.

10. In a device for measuring gas reactions, in combination, a closed container having an opening for the introduction of liquid into the chamber, a closure for said opening, a small chamber adjacent the upper part of the container adapted to contain liquid reagent in its lower portion, a pair of ducts connecting said chamber with the upper part of the container whereby gases may circulate through the chamber and the upper part of the container, a mechanical agitator in said upper part whereby gas and liquid may be effectively intermixed, a shaft carrying said agitator extending through one of said ducts, perforated plates on said shaft within the small chamber adapted to be partially immersed in said liquid and to bring liquid into effective contact with gas in the upper part of said chamber, antisplash baffles in last said duct, a capillary tube of glass communicating with said container, a liquid piston in said capillary tube, and a valve in series with said tube.

11. In a device for measuring gas reactions, in combination, a closed chamber for containing liquid and gas, a chamber for containing reagent adjacent the first said chamber, a pair of ducts connecting said chambers for circulating gas in a cyclic path through said chambers, a rotary stirrer in the reaction chamber, discs in the reagent chamber adapted to bring reagent and gas into extensive contact, a shaft extending through one of the ducts carrying said stirrer and discs, and means on said shaft for causing said circulation of gas through said chambers and ducts.

CARL H. NORDELL.